(12) United States Patent
Swinson et al.

(10) Patent No.: US 11,532,003 B2
(45) Date of Patent: *Dec. 20, 2022

(54) SYSTEM, METHOD AND COMPUTER PROGRAM FOR VARYING AFFILIATE POSITION DISPLAYED BY INTERMEDIARY

(71) Applicant: TrueCar, Inc., Santa Monica, CA (US)

(72) Inventors: Michael D. Swinson, Santa Monica, CA (US); Jason McBride, Santa Monica, CA (US); Isaac Lemon Laughlin, Los Angeles, CA (US); Thomas J. Sullivan, Santa Monica, CA (US)

(73) Assignee: TrueCar, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,474

(22) Filed: Jul. 16, 2021

(65) Prior Publication Data
US 2021/0342871 A1 Nov. 4, 2021

Related U.S. Application Data

(63) Continuation of application No. 16/670,448, filed on Oct. 31, 2019, now Pat. No. 11,132,702, which is a
(Continued)

(51) Int. Cl.
*G06Q 30/02* (2012.01)
(52) U.S. Cl.
CPC ..... *G06Q 30/0206* (2013.01); *G06Q 30/0277* (2013.01)
(58) Field of Classification Search
CPC .............. G06Q 30/0277; G06Q 30/0206
See application file for complete search history.

(56) References Cited

U.S. PATENT DOCUMENTS

| 5,774,873 A | 6/1998 | Berent et al. |
| 6,006,201 A | 12/1999 | Berent et al. |

(Continued)

FOREIGN PATENT DOCUMENTS

| CN | 102004768 A | * | 4/2011 | ............. G06Q 10/04 |
| CN | 102132300 | | 7/2011 | |

OTHER PUBLICATIONS

John Neter et al., Applied Linear Statistical Models, 4th Edition, Ch. 1, pp. 10-14, and Ch. 14, pp. 570-573, 1996.
(Continued)

*Primary Examiner* — Marie P Brady
(74) *Attorney, Agent, or Firm* — Sprinkle IP Law Group

(57) ABSTRACT

Endogenous and exogenous variables associated with an item for sale by an affiliate may be displayed to a user of an affiliate decision-making tool. In response to the user selecting one of the endogenous variables, the affiliate decision-making tool may compute a number of introductions, a number of leads, and a number of sales for each of a plurality of possible values of the endogenous variable. The computation may be done utilizing a display position algorithm. A visualization of effects of setting the endogenous variable at different levels may be presented. The user may interact with the display position algorithm to vary one or more of the plurality of possible values of the endogenous variable such that the affiliate is eligible or disqualified to be displayed by an intermediary in response to a search for the item by a visitor of a network site owned and operated by the intermediary.

20 Claims, 10 Drawing Sheets

Related U.S. Application Data continuation of application No. 14/604,014, filed on Jan. 23, 2015, now Pat. No. 10,482,485, which is a continuation of application No. 13/891,835, filed on May 10, 2013, now abandoned.

(60) Provisional application No. 61/646,075, filed on May 11, 2012.

(56) References Cited

U.S. PATENT DOCUMENTS

| | | | |
|---|---|---|---|
| 6,370,513 | B1 | 4/2002 | Kolawa et al. |
| 6,553,352 | B2 * | 4/2003 | Delurgio .............. G06Q 20/201 705/400 |
| 7,050,982 | B2 | 5/2006 | Sheinson |
| 7,092,929 | B1 * | 8/2006 | Dvorak .................. G06Q 30/00 706/14 |
| 7,219,080 | B1 | 5/2007 | Wagoner et al. |
| 7,302,429 | B1 | 11/2007 | Wanker |
| 7,379,890 | B2 * | 5/2008 | Myr ................ G06Q 10/06375 705/7.29 |
| 7,624,065 | B2 | 11/2009 | Schoen et al. |
| 7,835,982 | B2 | 11/2010 | Schoen et al. |
| 7,921,052 | B2 | 4/2011 | Dabney et al. |
| 8,112,325 | B2 | 2/2012 | Foy et al. |
| 8,126,881 | B1 | 2/2012 | Sethi et al. |
| 8,230,362 | B2 | 7/2012 | Couch |
| 8,326,845 | B2 | 12/2012 | Sethi et al. |
| 8,375,037 | B2 | 2/2013 | Sethi et al. |
| 8,521,619 | B2 | 8/2013 | Perry, III et al. |
| 8,538,828 | B2 | 9/2013 | Skutta |
| 8,589,212 | B2 | 11/2013 | Pollak et al. |
| 8,595,082 | B2 | 11/2013 | Skutta |
| 8,818,881 | B2 | 8/2014 | Himmerick et al. |
| 8,868,572 | B2 | 10/2014 | Sethi et al. |
| 9,103,743 | B2 | 8/2015 | Couch |
| 9,104,718 | B1 | 8/2015 | Levy et al. |
| 9,189,960 | B2 | 11/2015 | Couch et al. |
| 9,324,104 | B1 | 4/2016 | Levy et al. |
| 9,347,758 | B2 | 5/2016 | Berent et al. |
| D765,089 | S | 8/2016 | Agee |
| 9,412,203 | B1 | 8/2016 | Garcia, III et al. |
| 9,465,873 | B1 | 10/2016 | Franke et al. |
| 9,466,079 | B2 | 10/2016 | Hygema et al. |
| D774,523 | S | 12/2016 | Agee |
| D774,524 | S | 12/2016 | Agee |
| 9,600,822 | B2 * | 3/2017 | Pyle .................... G06Q 30/0643 |
| 9,727,904 | B2 | 8/2017 | Inghelbrecht |
| 10,482,485 | B2 | 11/2019 | Swinson |
| 2003/0014331 | A1 | 1/2003 | Simons |
| 2005/0154769 | A1 | 7/2005 | Eckart et al. |
| 2006/0129423 | A1 | 6/2006 | Sheinson et al. |
| 2006/0178973 | A1 | 8/2006 | Chiovari et al. |
| 2007/0185777 | A1 | 8/2007 | Pyle et al. |
| 2007/0233565 | A1 | 10/2007 | Herzog et al. |
| 2008/0275758 | A1 | 11/2008 | Clayton |
| 2008/0312994 | A1 | 12/2008 | Clayton |
| 2009/0006118 | A1 * | 1/2009 | Pollak ................ G06Q 30/0283 705/306 |
| 2009/0222316 | A1 | 9/2009 | Boinepalli et al. |
| 2010/0088158 | A1 * | 4/2010 | Pollack .............. G06Q 30/0629 705/26.1 |
| 2010/0121777 | A1 | 5/2010 | McGonigal et al. |
| 2010/0161408 | A1 | 6/2010 | Karson et al. |
| 2010/0198735 | A1 | 8/2010 | Basak et al. |
| 2010/0262495 | A1 * | 10/2010 | Dumon .............. G06Q 30/0623 705/14.54 |
| 2010/0274571 | A1 | 10/2010 | McFall et al. |
| 2010/0274631 | A1 | 10/2010 | McFall et al. |
| 2011/0066472 | A1 | 3/2011 | Scheider |
| 2011/0082759 | A1 | 4/2011 | Swinson et al. |
| 2011/0131652 | A1 | 6/2011 | Robinson et al. |
| 2011/0161197 | A1 | 6/2011 | Noy et al. |
| 2011/0202471 | A1 | 8/2011 | Scott et al. |
| 2012/0005070 | A1 | 1/2012 | McFall et al. |
| 2012/0233014 | A1 | 9/2012 | Banks et al. |
| 2012/0284087 | A1 | 11/2012 | Pollak |
| 2012/0284113 | A1 | 11/2012 | Pollak |
| 2013/0006916 | A1 | 1/2013 | McBride et al. |
| 2013/0191247 | A1 | 7/2013 | Huang et al. |
| 2013/0304571 | A1 | 11/2013 | Swinson et al. |
| 2013/0339173 | A1 | 12/2013 | Skutta |
| 2014/0032352 | A1 | 1/2014 | Fraser et al. |
| 2014/0032353 | A1 | 1/2014 | Fraser et al. |
| 2014/0067615 | A1 | 3/2014 | Park et al. |
| 2014/0089208 | A1 | 3/2014 | Humble et al. |
| 2014/0229391 | A1 | 8/2014 | East, III et al. |
| 2014/0257934 | A1 | 9/2014 | Chrzan et al. |
| 2014/0258044 | A1 | 9/2014 | Chrzan et al. |
| 2014/0278806 | A1 | 9/2014 | Duguid et al. |
| 2014/0279020 | A1 | 9/2014 | Duguid et al. |
| 2014/0279171 | A1 | 9/2014 | Burgiss et al. |
| 2014/0279229 | A1 | 9/2014 | Burgiss et al. |
| 2014/0279275 | A1 | 9/2014 | Burgiss et al. |
| 2014/0351074 | A1 | 11/2014 | Enge et al. |
| 2015/0058152 | A1 | 2/2015 | Pollak et al. |
| 2015/0134422 | A1 | 5/2015 | Swinson et al. |
| 2015/0206206 | A1 | 7/2015 | Puente et al. |
| 2015/0220876 | A1 | 8/2015 | Sethi et al. |
| 2015/0324737 | A1 | 11/2015 | Chrzan et al. |
| 2015/0324879 | A1 | 11/2015 | Lu et al. |
| 2015/0356672 | A1 | 12/2015 | Humble et al. |
| 2016/0343058 | A1 | 11/2016 | Levy et al. |
| 2016/0371323 | A1 | 12/2016 | Garcia, III et al. |
| 2020/0074490 | A1 | 3/2020 | Swinson |

OTHER PUBLICATIONS

Logistic Regression, Wikipedia, May 5, 2015 [downloaded from http://en.wikipedia.org/wiki/Logistic_regression], 17 pages.

Office Action issued for U.S. Appl. No. 13/891,835, dated Oct. 23, 2014, 11 pages.

Final Office Action issued for U.S. Appl. No. 13/891,835, dated Feb. 24, 2015, 13 pages.

Office Action issued for U.S. Appl. No. 13/891,835, dated Jul. 29, 2015, 46 pages.

Office Action issued for U.S. Appl. No. 13/891,835, dated Dec. 3, 2015, 8 pages.

Office Action issued for U.S. Appl. No. 13/891,835, dated Jun. 15, 2016, 10 pages.

Office Action issued for U.S. Appl. No. 13/891,835, dated Sep. 27, 2016, 14 pages.

Office Action issued for U.S. Appl. No. 13/891,835, dated Feb. 24, 2017, 16 pages.

Office Action issued for U.S. Appl. No. 14/604,014, dated Mar. 7, 2018, 40 pages.

Office Action issued for U.S. Appl. No. 14/604,014, dated Aug. 23, 2018, 14 pages.

Office Action issued for U.S. Appl. No. 16/670,448, dated Feb. 19, 2021, 11 pages.

Notice of Allowance issued for U.S. Appl. No. 16/670,448, dated Jun. 7, 2021, 11 pages.

* cited by examiner

| Variable Type | Name | Value |
|---|---|---|
| Endogenous | Variable 1 | 17 |
| | Variable 2 | 200 |
| | Variable 3 | -19 |
| | Variable 4 | 22 |
| Exogenous | Variable 1 | 0.314992415 |
| | Variable 2 | 22.9 |
| | Variable 3 | 99 |
| | Variable 4 | 214 |
| | Variable 4 | 22 |

*FIG. 7A*

| Possible Values of Variable 2 | Introductions | Leads | Sales | Revenue | Display Position |
|---|---|---|---|---|---|
| 0 | 0 | 0 | 0 | 0 | Not Shown |
| 50 | 0 | 0 | 0 | 0 | Not Shown |
| 100 | 0 | 0 | 0 | 0 | Not Shown |
| 150 | 8 | 4 | 1 | 200 | 3 |
| 200 | 8 | 4 | 1 | 200 | 3 |
| 250 | 8 | 4 | 2 | 400 | 3 |
| 300 | 8 | 4 | 2 | 400 | 3 |
| 350 | 55 | 26 | 10 | 2000 | 2 |
| 400 | 55 | 26 | 11 | 2200 | 2 |
| 450 | 55 | 26 | 14 | 2800 | 2 |
| 500 | 55 | 26 | 14 | 2800 | 2 |
| 550 | 55 | 26 | 15 | 3000 | 2 |
| 600 | 55 | 26 | 16 | 3200 | 2 |
| 650 | 55 | 26 | 17 | 3400 | 2 |
| 700 | 55 | 26 | 17 | 3400 | 2 |
| 750 | 55 | 26 | 21 | 4200 | 2 |
| 800 | 55 | 26 | 22 | 4400 | 2 |
| 850 | 92 | 43 | 30 | 6000 | 1 |
| 900 | 92 | 43 | 39 | 7800 | 1 |
| 950 | 92 | 43 | 40 | 8000 | 1 |
| 1000 | 92 | 43 | 43 | 8500 | 1 |

1 See What Others Paid  >  ② View TrueCar Dealer Prices  >  3 Get Certificates

| ☑ Certified Dealer<br>2 years, 4 months \| 195 total sales | 11.9 mi<br>from 90401 | TRUECar Price Estimate<br>$15,519<br>Savings off $17,025 MSRP<br>$1,506 | ← 1101 |
| ☐ Certified Dealer<br>6 years, 5 months \| 1555 total sales | 15.8 mi<br>from 90401 | TRUECar Price Estimate<br>$15,219<br>Savings off $17,025 MSRP<br>$1,806 | ← 1103 |
| ☑ Certified Dealer<br>5 years, 7 months \| 610 total sales | 19.6 mi<br>from 90401 | TRUECar Price Estimate<br>$15,469<br>Savings off $17,025 MSRP<br>$1,556 | ← 1105 |

*FIG. 11*

SYSTEM, METHOD AND COMPUTER PROGRAM FOR VARYING AFFILIATE POSITION DISPLAYED BY INTERMEDIARY

CROSS-REFERENCE TO RELATED APPLICATIONS

This application is a continuation of and claims a benefit of priority under 35 U.S.C. § 120 of the filing date of U.S. patent application Ser. No. 16/670,448, filed Oct. 31, 2019, entitled "SYSTEM, METHOD AND COMPUTER PROGRAM FOR VARYING AFFILIATE POSITION DISPLAYED BY INTERMEDIARY," issued as U.S. Pat. No. 11,132,702, which is a continuation of and claims a benefit of priority under 35 U.S.C. § 120 of the filing date of U.S. patent application Ser. No. 14/604,014, filed Jan. 23, 2015, entitled "SYSTEM, METHOD AND COMPUTER PROGRAM FOR VARYING AFFILIATE POSITION DISPLAYED BY INTERMEDIARY," issued as U.S. Pat. No. 10,482,485, which is a continuation of and claims a benefit of priority under 35 U.S.C. § 120 of the filing date of U.S. patent application Ser. No. 13/891,835, filed May 10, 2013, entitled "SYSTEM, METHOD AND COMPUTER PROGRAM FOR VARYING AFFILIATE POSITION DISPLAYED BY INTERMEDIARY," which claims a benefit of priority under 35 U.S.C. § 119(e) from U.S. Provisional Application No. 61/646,075, filed May 11, 2012, entitled "SYSTEM, METHOD AND COMPUTER PROGRAM FOR VARYING DISPLAY POSITION IN AN ONLINE MARKET WITH KNOWN DEMAND," all of which are fully incorporated herein by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to ecommerce and online markets. More particularly, this disclosure relates to an innovative methodology and system and computer program implementing the methodology that enables an affiliate of an intermediary ecommerce company to determine how various factors may be modified in order to change the position of the affiliate and/or an item associated therewith being displayed to consumers in an online market hosted by the intermediary ecommerce company.

BACKGROUND

Consumers are becoming savvier. This is especially true when access to the Internet is readily available and research on a product or service can be easily accomplished online. Various sites on the Internet have made it easy for consumers to search for products and services alike before making a purchase. Depending upon the capabilities of the network sites, consumers searching for certain products or services may be presented with various types of information. For example, a consumer may search for a product or service via a portal or search site. In response to the consumer's request, the search site may display a list of hyperlinks corresponding to sellers that offer the requested product or service. When the consumer clicks on a hyperlink corresponding to one of the sellers, the consumer's browser is directed to the consumer-selected seller's website. The consumer-selected seller may have the requested product or service available for purchase through its website or at a physical location near the consumer.

In this case, the search site can be seen as an intermediary between the consumer and the consumer-selected seller. However, the consumer-selected seller may not be affiliated with the search site and, unlike advertisers that pay the search site to display ads, directing the consumer to the consumer-selected seller may not yield financial benefits to the search site. On the other hand, the consumer-selected seller may have no control as to how it is ranked on the list provided by the search site in response to the consumer's search query on a particular product or service.

SUMMARY OF THE DISCLOSURE

With the increasing popularity of consumers doing online searches for candidate sales outlets (also referred to herein as vendors, sellers, dealers, etc.) before making purchases, there is an increasing opportunity to yield certain financial benefits for an intermediary ecommerce company by directing its website visitors toward affiliated sales outlets (which is interchangeably referred to herein as "affiliates").

For example, a consumer may initiated a search for a good or service at a network site owned and operated by an intermediary ecommerce company. When an eligible outlet is competing against others to sell the good or service to the consumer, it is desirable that an affiliate's outlet be included in the search result provided by the intermediary ecommerce company to the consumer and the online presentation thereof. It is further desirable that not only an affiliate's outlet be included in the online presentation, but also be placed at a favorable position displayed to the consumer. One reason is that, if chosen for inclusion, the order in which the eligible outlets are presented (display position) often is positively correlated to the probability of sale. In some presentations, the outlet at the top of the display (in the first position) may have a higher probability of actually selling the good or service than other outlets displayed.

This disclosure describes a methodology and a useful decision-making tool implementing same that enable a business customer or affiliate of an intermediary such as an intermediate ecommerce company to determine how various business decisions and performance (i.e., setting of item prices, inventory management—including pricing and accessibility of substitutes, relative velocity of recent sales, customer satisfaction rates, etc.) may be modified in order to be included in the display and/or to change their position displayed to a consumer visiting an online market owned and operated by the intermediary. Using various levers to achieve a desired display position can allow an affiliate to have more control over the amount of times and/or how he is presented to a customer, thereby influencing gross margin (the difference between the sales price and the cost of the item).

In some embodiments, a system implementing a methodology disclosed herein may include an affiliate decision-making tool executing on one or more server machines owned and operated by an intermediary. The affiliate decision-making tool may be configured to, among others, cause endogenous and exogenous variables to be displayed on a client machine communicatively connected to the one or more server machines. These endogenous and exogenous variables may be associated with an item for sale by an affiliate owning and operating the client machine. As an example, the item may represent a specific vehicle configuration.

In response to a user at the client machine selecting one of the endogenous variables, the system may compute a number of introductions, a number of leads, and a number of sales for each of a plurality of possible values of the endogenous variable. The system may cause a visualization on the client machine to show effects of setting the first endogenous variable at different levels of the number of introductions, the number of leads, and the number of sales.

In some embodiments, the affiliate decision-making tool may implement a display position algorithm configured to compute an expected revenue for the intermediary and a display position for the affiliate. The display position algorithm may also compute an expected revenue for the affiliate. The affiliate decision-making tool may allow the user at the client machine to interact with the display position algorithm to vary one or more of the plurality of possible values of the endogenous variable such that the affiliate is eligible or disqualified to be displayed by the intermediary in response to a search for the item by a visitor of a network site owned and operated by the intermediary.

In some embodiments, the display position algorithm can be configured to compute, for the affiliate, an adjustment to the endogenous variable such that a display position for the affiliate is not more than a maximum number of display positions set by the intermediary, thereby ensuring that the affiliate is displayed by the intermediary in response to a search for the item.

In some embodiments, the display position algorithm can be configured to compute, for the affiliate, an adjustment to the endogenous variable such that a display position for the affiliate is at a specific position set by the affiliate. The specific position can be within a maximum number of display positions set by the intermediary for responding to a search for the item.

In some embodiments, a computer program product may include at least one non-transitory computer-readable medium storing instructions translatable by at least one processor to implement a methodology disclosed herein. Various implementations may be possible.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7A depicts example variables utilized in one embodiment of a methodology disclosed herein.

FIG. 7B depicts possible values of an example variable utilized in one embodiment of a methodology disclosed herein.

Figures 8, 9:
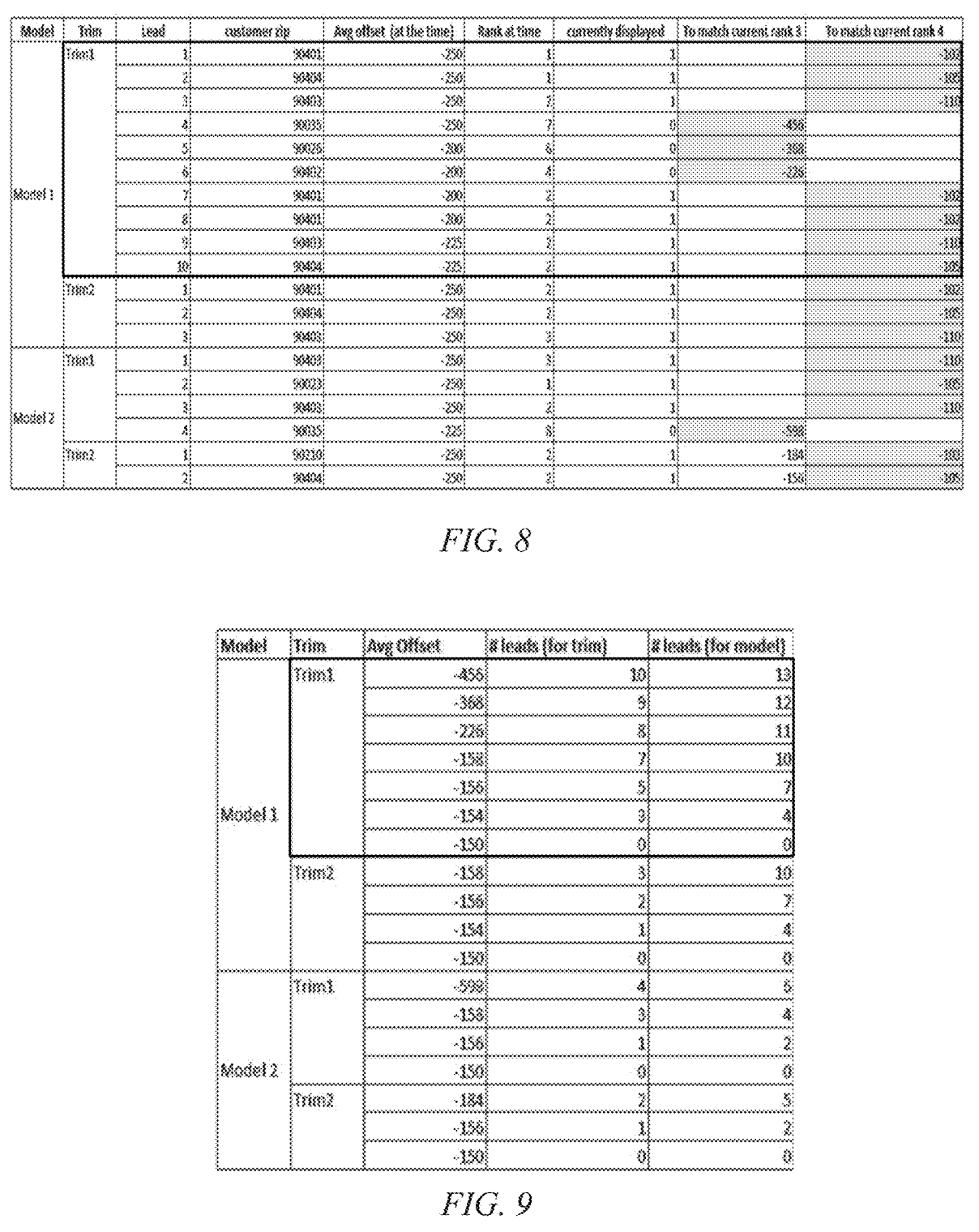

FIG. 8 illustrates by example how price changes may, according to one embodiment disclosed herein, affect whether an affiliate is displayed and, if displayed, in what position.

FIG. 9 depicts example aggregate prices information of certain models and trims for an affiliate according to one embodiment disclosed herein.

FIG. 11 depicts an example interface showing a portion of a vehicle data system implementing one embodiment of a methodology disclosed herein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before discussing embodiments of the invention, a topology where embodiments disclosed herein can be implemented is described with reference to FIG. 1. As one skilled in the art can appreciate, the exemplary architecture shown and described herein with respect to FIG. 1 is meant to be illustrative and not limiting.

Figure 1:
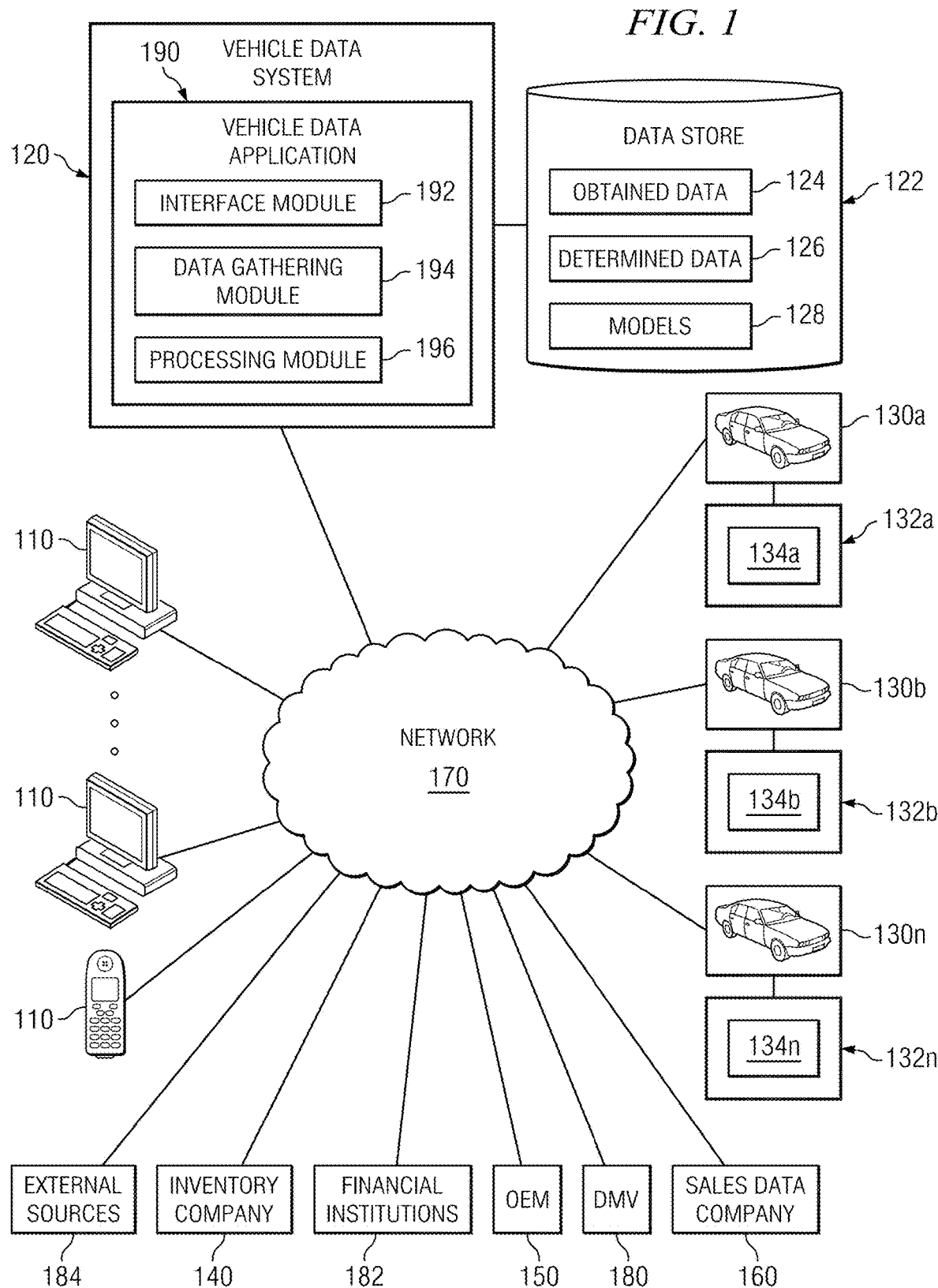
FIG. 1 depicts of one embodiment of a topology including a vehicle data system.

FIG. 1 depicts one embodiment of a topology which may be used to implement embodiments of the systems and methods disclosed herein. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Computing devices 110 may be used by consumers while conducting a search for consumer goods and/or services, such as automobiles. Network 170 may be or include, for example, a wireless or wired communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer-readable media where the instructions are configured to perform at least some of the functionality associated with embodiments disclosed herein. These applications may include a vehicle data application 190 comprising one or more applications (instructions embodied on one or more non-transitory computer-readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality, including utilizing one or more interfaces 192 configured to, for example, receive and respond to queries from users at computing devices 110; interface with inventory companies 140, manufacturers 150, sales data companies 160, financial institutions 182, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set on the computing devices 110 and data determined from the processing, and present these interfaces to the user at the user's computing device 110. Interfaces 192 may visually present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). For a detailed discussion and examples of quantifiable prices and price ranges, readers are directed to U.S. patent application Ser. No. 12/556,076, filed Sep. 9, 2009, entitled "SYSTEM AND METHOD FOR AGGREGATION, ANALYSIS, PRESENTATION AND MONETIZATION OF PRICING DATA FOR VEHICLES AND OTHER COMMODITIES," and U.S. patent application Ser. No. 12/556,109, filed Sep. 9, 2009, entitled "SYSTEM AND METHOD FOR CALCULATING AND DISPLAYING PRICE DISTRIBUTIONS BASED ON ANALYSIS OF TRANSACTIONS," which are fully incorporated herein by reference. Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the understanding for a user of the presented data, the interface may also present data related to incentives which were utilized to determine the presented data or how such incentives were applied to determine presented data.

Turning to the various other entities in topology 100, dealer 130 may be a retail outlet for consumer goods and/or services, such as vehicles manufactured by one or more of OEMs 150. Dealers 130 may be affiliates of vehicle data system 120. To track or otherwise manage sales, finance, parts, service, inventory and back office administration needs, dealers 130 may employ a dealer management system (DMS) 132. Since many DMS 132 are Active Server Pages (ASP) based, transaction data 134 may be obtained by vehicle data system 120 directly from the DMS 132 with a "key" (for example, an ID and Password with set permissions within the DMS system 132) that enables data to be retrieved from the DMS system 132. Many dealers 130 may also have one or more websites which may be accessed by vehicle data system 120 over network 170, where pricing data pertinent to the dealer 130 may be presented on those websites, including any pre-determined, or upfront, pricing. This price is typically the "no haggle" price (i.e., price with no negotiation) and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites.

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes, but may not include any personally-identifiable information (PII) about the buyer.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle though the personally-identifiable information about the buyer are not used by 122. Sales data companies 160 may include any entities that collect any type of vehicle sales data. For example, syndicated sales data companies aggregate new and used sales transaction data from DMS 132 systems of particular dealers 130. These companies may have formal agreements with dealers 130 that enable them to retrieve data from dealer 130 in order to syndicate the collected data for the purposes of internal analysis or external purchase of the data by other data companies, dealers, and OEMs.

Manufacturers 150 can be those entities which actually build the vehicles sold by dealers 130. To guide the pricing of their vehicles, manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), etc.

It should be noted here that not all of the various entities depicted in topology 100 are necessary, or even desired, in embodiments disclosed herein, and that certain of the functionality described with respect to the entities depicted in topology 100 may be combined into a single entity or eliminated altogether. Additionally, in some embodiments, other data sources not shown in topology 100 may be utilized. Topology 100 is therefore exemplary only and should in no way be taken as imposing any limitations on embodiments disclosed herein.

With the growth of internet commerce and the increasing popularity of consumers performing online searches for candidate dealerships before visiting the dealerships and perhaps making on-site purchases, there can be increasing financial benefits for an intermediary ecommerce company to direct consumers toward affiliated sales outlets. As an example, an operator of vehicle data system 120 may desire to direct users at computing devices 110 toward dealers 130.

In this context, sales volume for an affiliate can be influenced by:
 a) online display of the affiliate by an intermediary; and
 b) the display position in which the affiliate is displayed by the intermediary.

Figure 2:
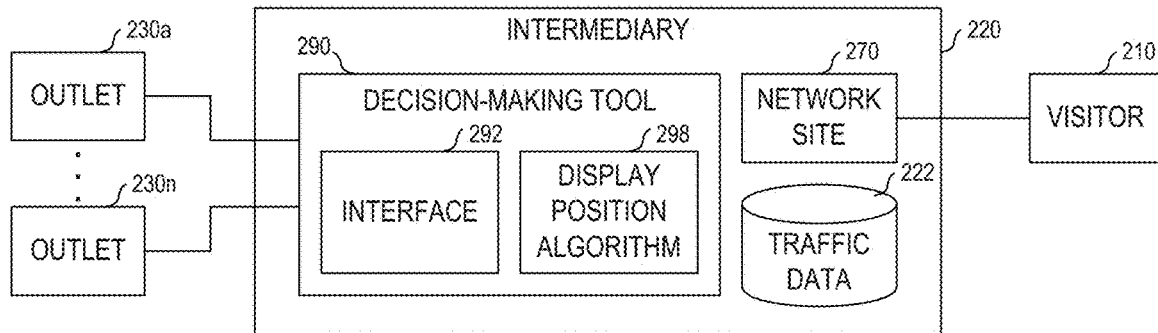
FIG. 2 depicts a diagrammatic representation of one embodiment of a system implementing a methodology disclosed herein.

With this understanding, turning now to FIG. 2 which depicts a diagrammatic representation of one embodiment of system 200 implementing a methodology disclosed herein. One embodiment of vehicle data system 120 described above can be an example of system 200. An ecommerce intermediary 220 may host an online market place or network site 270. Visitor 210 may visit network site 270 to search for candidate dealerships or outlets 230a . . . 230n for a particular vehicle configuration. Information such as network traffic data associated with this visit and others alike may be gathered and stored in database 222. Other types of information may also be collected as described above. In this example, system 200 includes decision-making tool (also referred to herein as an affiliate decision-making or ADM tool) 290 constructed to help affiliates of intermediary 220 (in this example, outlets 230a . . . 230n) achieve target sales volume levels by affecting the level and quality of introductions to potential customers (defined in one embodiment as the number of times a dealer is displayed). Embodiments of an ADM tool may implement the following features:

1. A display position algorithm configured to determine, select, and rank affiliates for display—the mechanics of the algorithm may vary as long as there exists a "what-if" capability that allows a user of the ADM tool such as a manager of an affiliate to explore, via a user friendly graphical interface, how various decisions would impact the resulting number of introductions.
2. An ability for users—in the course of their business operation—to modify some of inputs that are used by the algorithm. The ADM tool can then present any effects of each modification and the users can make an informed decision and can change real inputs (price, inventory, etc.) to mirror changes made using the ADM tool (with respect to varying the number of introductions).
3. The display position algorithm may be triggered by an online search at a network site owned and operated by an intermediary. To this end, computation of the number of introductions for an affiliate may require a known or estimated amount of demand for the good or service for which online searches will be conducted. The ADM tool therefore has knowledge of or can estimate:
 a. how many times the display position algorithm will be run, and
 b. how many times a user will select an affiliate for display.
4. Optionally, if the user of the ADM tool wishes to convert ranked introductions into sales volume or gross margin metrics, the ADM tool may provide the user:
 a. the likelihood that an introduction will turn into a sales lead (when a consumer engages an affiliate based on the introduction) as a function of the display rank;
 b. the relationship between a sales lead and the probability of sale; and
 c. the gross margin realized by the affiliate (not the e-commerce intermediary) associated with each sale.

In some embodiments, the ADM tool can be used by an affiliate to influence the amount and position of displays of their retail outlet as a seller of the good or service being requested by an online user. The ability to understand and control the amount of known demand that will be introduced to a seller can help optimize gross margin, throttle or expand introductions to reflect inventory availability, build web presence, and generate opportunities to make residual income from banner advertisements.

As illustrated in the example of FIG. 2, system 200 has several inter-related components. Specifically, display position algorithm (DPA) 298 is configured to compute the display order for eligible outlets that can result, given an online search for a good or service at network site 270. Interface 292 is configured with a visualization capability that can translate the outcome of DPA 298 into usable metrics, including introductions, sales, and gross margin. Affiliate decision-making (ADM) tool 290 is configured to allow an authorized user representing an eligible outlet to interact, via interface 292, with DPA 298 to explore ways in which they may vary the number and position of the displays they will receive given a known amount of demand (as determined based on network traffic data associated with a particular vehicle configuration).

In some embodiments, the ADM tool may implement a so-called "pay-per-sale" (PPS) regime where an affiliate selling the good or service pays an intermediary e-commerce company that a) maintains and operates the DPA that generates introductions and b) is paid a per-unit revenue by the affiliate who was introduced by the intermediary if, and only if, a sale occurred as a result of the introduction. In one embodiment, this distinction can be important as the DPA can be based on an objective of maximizing the revenue of the intermediary rather the affiliate—though the two values are often highly positively correlated. In other embodiments, the DPA could be easily modified to be based on an affiliate-centric metric or could be based on a 'pay-per-lead' regime where the outcome of the introduction (sale or no sale) is irrelevant—that is, the affiliate pays the intermediary company simply for the display or the resulting lead (if it follows from the introduction). However, the modifications to address these variants are minimal. Here, for the purpose of illustration, the most complex case is presented.

One embodiment of a methodology for varying an affiliate position displayed by an intermediary will now be described with reference to FIG. 3.

Figure 3:
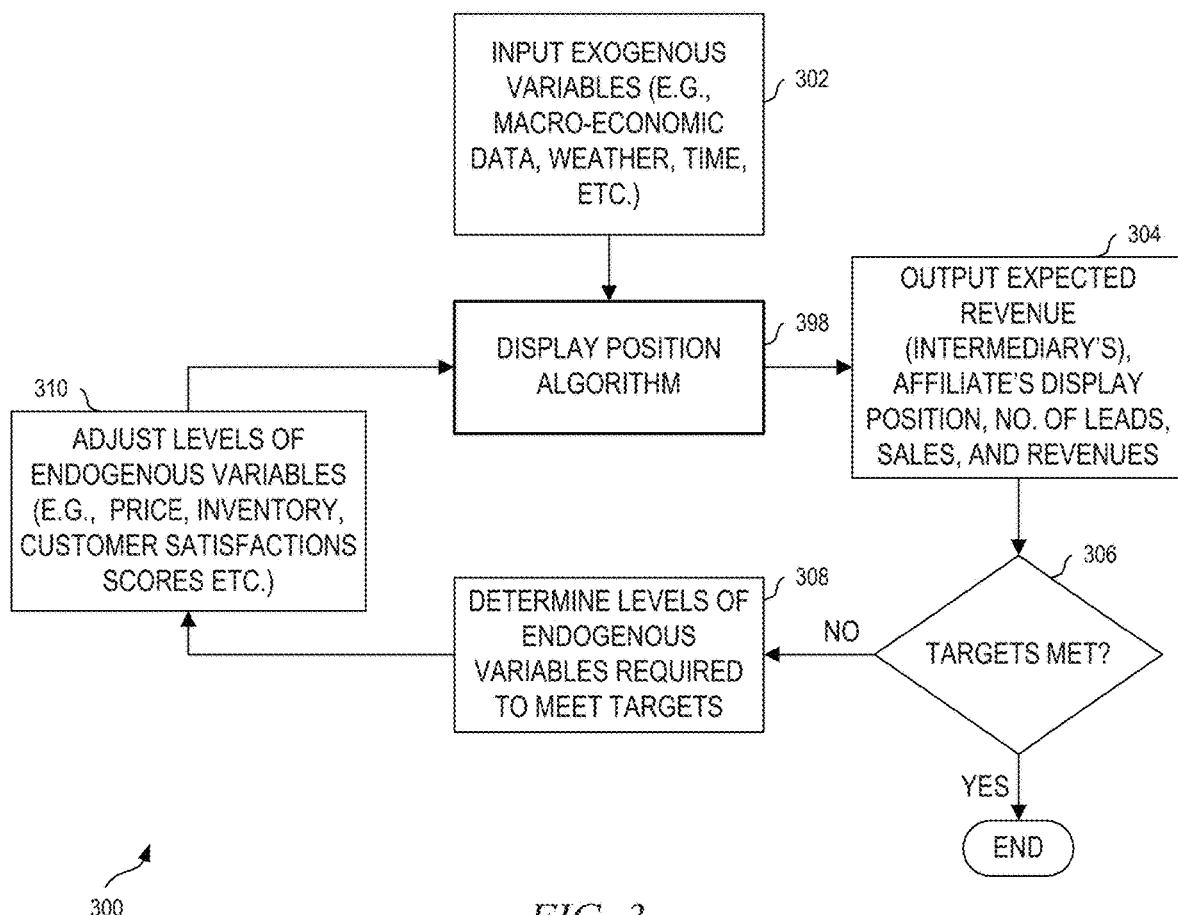
FIG. 3 depicts a diagrammatic representation of an example data flow according to one embodiment of a method for varying an affiliate position displayed by an intermediary.

FIG. 3 depicts a diagrammatic representation of example data flow 300 according to one embodiment of a method for varying an affiliate position displayed by an intermediary. Display position algorithm (DPA) 398 can be an example embodiment of DPA 298 described above. In this example, exogenous variables such as macro-economic data, weather, time, etc. of which an affiliate has no control are inputted into DPA 398 (step 302).

If revenue maximization is the goal of an intermediary owning and operating a network site where visitors can search for retail outlets for items for sale, embodiments of a DPA can be configured to compute an expected revenue for the intermediary. At this point, it can be useful to first define the expected revenue and then further explore each of its components. The actual amount of revenue expected to be paid to the intermediary is a function of:

$P_{i,t,z}$: the expected probability that a customer located in geographic unit z will purchase item t from outlet i if it is displayed to them during an online search;

$\pi_{i,t}$: the per-unit revenue paid by outlet i to the e-commerce intermediary if an introduction results in a sale of item t by outlet I; and $\kappa$: the maximum number of retail outlets that the intermediary displays in response to the online search.

The expected revenue for the intermediary (the revenue expected to be paid to the intermediary by outlet i), $ER_i$, is then:

$$ER_{i,t,z} = P_{i,t,z} \times \pi_{i,t}.$$

At the time of the online search by a customer for item t located in geographic unit z, an expected revenue, $ER_{i,t,z}$, is computed for all eligible affiliates (those with whom the intermediary has an agreement to pay $\pi_{i,t}$ should the introduction result in a sale) where i=1, ..., I. After the expected revenue values are calculated, they are sorted in descending order and assigned a rank, $O_r(i)$, where r=1, ..., I. For example, the outlet i yielding the highest expected revenue among the cohort of eligible affiliates is assigned a rank of $O_1(i)$, the outlet with the next highest is expected revenue is assigned a rank of $O_2(i)$, and so on until all affiliates in the cohort have been assigned a rank. In the event of a tie, any number of secondary sorting rules could be applied such as alphabetical, closest affiliate to customer, randomly, etc.

In one embodiment, a system owned and operated by an intermediary may, in response to a consumer's search request for a retail item within a defined geographical area, present to the consumer via the intermediary's network site a list of dealers of the retail item within the geographical area, utilizing a proprietary display position algorithm. One example model implementing an embodiment of a display position algorithm, referred to as the Dealer Scoring Algorithm (DSA), will now be described.

In this example DSA model, various types of data may be utilized, including DSA log data, drive distance data, and dealer inventory data. The DSA log data may indicate if a lead for trim tin ZIP code z (also referred to as a "search zip code") generated through the intermediary's network site to any dealer, i, results in a sale. As a specific example, cohorts with leads less than 15 days old can be excluded since the leads take time to convert into sales. Such leads may be excluded to prevent underestimate the close rate of dealers. Other temporal limitations may also be possible.

Figure 4:
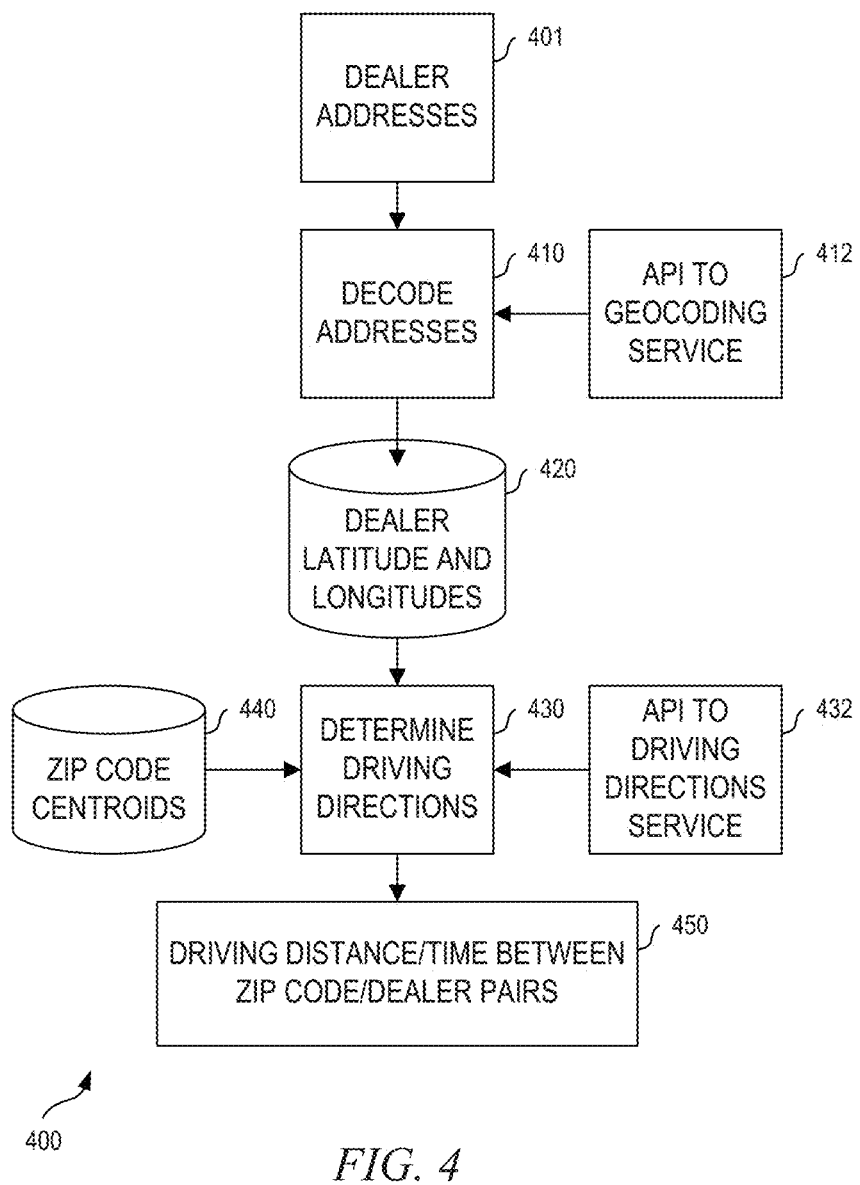
FIG. 4 depicts a diagrammatic representation of an example data flow according to one embodiment of a dealer scoring algorithm.

The drive distance and drive time of a search zip code to a dealer location can be obtained from online sources. Referring to FIG. 4, as a specific example, DSA model 400 may implement first program 410 for decoding dealer addresses 401 via API 412 to an online geocoding service. Outputs from first program 410 may include latitude and longitude information 420 for dealer addresses 401. DSA model 400 may also implement second program 430 for determining driving distance and/or time 450 based on various types of data, including latitude and longitude information 420 for dealer addresses 401 and driving directions obtained via API 432 to an online driving directions service such as mapquest.com. In the case of missing values, the drive distance and drive time value can be imputed based on the average drive distance and great circle distance ratio for similar nearby ZIP codes, based on zip code information from database 440.

Dealers' new car inventory information can be obtained from data feeds provide by dealers themselves. As described above, such dealers are considered affiliates of the intermediary.

In addition to data types, various types of features may be considered in the calculation of probability of closing in the DSA model. Example features will now be described.

Features describing an individual vendor ($X_{\cdot,i,t}$):

Common factors for these features may include price, distance from the buyer, available inventory, services and perks, vendor reputation, historical sales performance and so on. In this example DSA model, distance can be one of the most important factors influencing buyers' decisions for large products like vehicles. In some embodiments, radial distance can be used. In some embodiments, drive distance can be a better indicator of the true travel distance as there may be certain areas with islands and lakes. Drive time is also introduced into the DSA model because the same drive distance in different locations might be associated with a different drive time. For example, 60 miles might require a 1 hour drive in a rural area but 2 hours or more in a big city. In some embodiments, drive time is utilized because it can be equalized to facilitate comparison across different locations.

Price can play a big role in sales in a competitive market. The price offset relative to the invoice price of the vehicle can be an important factor in the example DSA model. To reduce the price variance of different vehicles, the price offset as a percentage of invoice price can be used as the main price variable in the example DSA model. Where the worst price and best price do not differ substantially, an additional variable that can measure the absolute difference of price as a percentage of the worst price can be used to adjust for the effect of price on probability of sale for those cases. For dealers who do not provide an upfront price, the maximum price allowed by the program max value can be used for their price offset.

Dealers have certain characteristics that may cause a car buyer to prefer them over others. Such characteristics may include their car inventory, special services, historical performance, and locations. Customers often complain that they are not able to get the cars they want when they go to the dealers. Surveys indicate that vehicle unavailability can be a big cause of sale failure. It is reasonable to assume that a larger dealership is more likely to have the customer's preferred vehicle than a smaller dealership. To this end, the example DSA model incorporates dealers' overall new car inventory as a variable to measure the overall dealership size. Dealers with no inventory information can be assigned an average value of inventory in the candidates' dealer list for each cohort. The comprehensiveness of the inventory can be continually improved for affiliated dealers.

The example DSA model includes additional drive distance and/or drive time derived variables to capture the sale and distance relationship for certain special cases. For example, it is possible that the drive time for the closest dealer and furthest dealer does not differ substantially. In those cases, weights on drive time can be adjusted to avoid overestimate the effect of minimum drive time on sale.

In addition to the vehicle of choice, car buyers may also consider the warranty, maintenance and other services offered by a dealer during their decision process. A system implementing the example DSA model may display dealers' special services along with their upfront price and location in search results. Such special services may be considered as a potential factor that might influence the probability of closing a sale. For example, a "perks" dummy variable may be defined as 1 if a dealer provides any one of a plurality of services such as limited warranty, money back guarantee, free scheduled maintenance, quality inspection, delivery, free car wash, and 0 otherwise.

In this example DSA model, probability of sale can be highly correlated with the historical performance of a dealer. Dealers with excellent sales people and/or good reputations should have higher close rates than others. Such factors can be measured by their historical close rates. As a specific example, the DSA model can calculate the close rate for each dealer based on their performance in the preceding 45 day window. In this case, a period of 45 days is chosen as the width of the window because it is a medium length time window that will provide a dealer's historical performance, but also can quickly reflect the changes of the overall vehicle market due to factors such as gas price change or new model release and so on. Equation (1) below provides for the details of calculation of dealer close rate. Since, in some embodiments, some dealers may only take leads from zip codes that are located within 60 miles, the close rate in this example is based on the sales and leads from within 60 miles of driving distance. When the close rate is missing due to no sale or no leads in the past 45 days, the average close rate for nearby dealers can be used. Those skilled in the art will appreciate that the number of preceding days and the driving distance described in this example and presented in Equation (1) are meant to be illustrative and non-limiting and that other values may be used.

$$\text{Dealer close rate} = \frac{\text{(Count of sales in last 45 days)}}{\text{(Count of leads in last 45 days)}} \quad \text{Equation (1)}$$

To better predict the inventory status of a dealership and put more weight on dealers' most recent performance, a variable "defending champion" is included in the example DSA model as another type of performance measuring variable. The defending champion variable allows those dealers with more recent sales be assigned a higher weight. For instance, dealers will get more credit for a successful sale yesterday than for a sale from 30 days ago. This also serves as a proxy for inventory in that the dealers who have recently made a sale for a make will have a higher chance of having similar cars in their inventory than dealers who have not made a sale for a while.

In addition, dealer location can be very important to sales when the customer is located on the border of two states. Due to the different rules on vehicle regulation and registration, people might tend to go to a dealer located in the same state as where they live. A "Same State" dummy variable is therefore included in the example DSA model to indicate if the customer and dealer are located in the same state.

Features of an Individual Vendor as Compared to Other Vendors ($X_{i,t,s}$):

The absolute value of an individual vendor's attributes do not necessarily reflect its advantage or competitiveness, but they do when compared relative to other vendors' attributes. Therefore, vendor features relative to other competitors can be important factors in predicting the probability of sale in the example DSA model.

In this example DSA model, most of the individual dealer features such as drive time, price offset, historical close rate, inventory and defending champing can be rescaled among all the candidate dealers within each cohort. For example, individual dealer's historical dealer close rate and new car inventory variables $v_i$ can be rescaled using Equation (2) below:

$$x_i = \frac{\left(v_i - \min_i v\right)}{\left(\max_i v - \min_i v\right)} \quad \text{Equation (2)}$$

Drive time, defending champion and price can be rescaled using Equation (3) below:

$$x_i = 1 - \frac{(v_i - \min_i v)}{(\max_i v - \min_i v)} \quad \text{Equation (3)}$$

The rescaled variables can have values between 0 and 1 such that the best dealer in each competitive cohort gets a value of 1. For example, the dealer with the highest historical close rate gets a rescaled close rate of 1 and the dealer with lowest close rate gets a value of 0. Similarly, the dealer with the minimum drive time gets a value of 1 and the dealer with maximum drive time gets a value of 0. Coercing these values onto the same scale allows for comparison of dealers across competitive cohorts.

Features Describing an Individual Customer ($Y_{c,t}$):

Demographic features of individual customers can predict different interests in products and the likelihood of buying from a particular dealer. These may include income, family size, net worth, gender, their distance from the dealer, etc. Demographic data can be obtained from public data sources such as the U.S. census or online user databases for different industries.

In the example DSA model, searched vehicle make and customer local dealer density are included in predicting the probability of buying for a particular cohort. A customer's choice of vehicle make can potentially be an indicator of that customer's income, family size, etc. It is highly possible that people purchasing luxury cars are less sensitive to price and more sensitive to drive time. To this end, the DSA model can be configured to put more weights on distance when the customer indicates a high income zip code to increase the probability of closing. It is also reasonable to assume that price may be more important on sale for customers located in big cities with high dealer density while distance is more crucial for people in rural areas with only a few dealerships available within 200 miles. A count of available dealers within a certain drive time radius may be used as network density variables. In this example, a dummy variable for each make may be included in the DSA model selection process using SAS proc logistic, which is known to those skilled in the art. As a specific example, three out of 35 makes (Mercedes-Benz, Mazda, Volkswagen) have significant p-values for their dummy variables, indicating that these three makes have different sales probability compared to other makes. Testing on the make and dealer density interaction indicates that the interaction between Mercedes-Benz and dealer density remains significant. Although the make and network features may not affect the dealer ranks within each cohort (each cohort can have the same make and density information for different candidate dealers), they may affect the expected revenue for each dealer and the expected revenue for the intermediary. Therefore, these features are included in the example DSA model.

In the car buying industry, it can be observed that certain dealers have outstanding performance in certain zip code areas compared to their average performance across all the zip codes. This may be due to some customer population characteristics in certain zip codes. For example, a zip code with high density of immigrants whose first language is not English might go to a dealership with sales persons who can speak their first language and/or have a dealer website with their first language. Therefore, a variable measuring each dealer's performance in specific zip code is also included in the example DSA model.

Features describing historical interactions of a particular customer and a particular vendor ($Y_{c,i}$):

In addition to individual customers' features, their historical buying preferences may also influence their purchasing behavior. Examples of historical buying preferences may include frequency and volume of transactions, the price tier (low, medium high) in which their transactions fall, vendor's historical sales to that customer (a proxy for loyalty), etc.

In the car buying example, it is possible that a customer might go to the same dealer if they had purchased a car from this dealer before. The customer loyalty effect might even be bigger in some other industries which provide services rather than actually products. This could be one of the most important factors for predicting the probability of buying for a particular customer from a certain dealer/vendor/retailer/outlet.

Operationally, the DSA may use the estimated model by feeding in the values of the independent variables, computing the probabilities for each candidate dealer, and present the dealers with the top probabilities of closing to customer c. It may consider all dealers, (i=1, . . . K) selling the same trim (t=1, . . . , T) to users in ZIP Code z (z=1, . . . , ZL) located in the same locality L (z∈L if, in one embodiment, the great circle or radial distance from the customer's search ZIP code center to dealer location 250 miles). The DSA model may utilize a logistic regression based on the combined data of inventory, DSA logs, drive distance, and dealer perks, as illustrated in Equation (4) below:

$$P_c = f(P_s, P_b) = \frac{1}{1 + e^{-(\theta_{i,t,S} + \delta_{c,t,i})}} \quad \text{Equation (4)}$$

where $\theta_{i,t,S} = \beta_o$

{Features of Individual Dealer, i}
+$\beta_1$×the make of trim tis Mercedes-Benz
+$\beta_2$×Mercedes-Benz make and density interaction
+$\beta_3$× Mazda make and density interaction
+$\beta_4$× Volkswagen make and density interaction
+$\beta_5$× count of dealers within 30 min drive
+$\beta_6$×count of dealers within 1 hour drive
+$\beta_7$× count of dealers within 2 hours drive
+$\beta_8$× dealer's perks
+$\beta_9$× dealer's rescaled price within each cohort
+$\beta_{10}$×dealer's historical close rate
{Features Relative to Other Candidate Dealers, i,S}
+$\beta_{11}$× if dealer has the minimum drive time
+$\beta_{12}$× if dealer has lowest price within each cohort
+$\beta_{13}$× difference between the dealer's price and maximum price offset in percentage of invoice; and
where $\delta_{c,t,i} = \alpha_o$ {Features of Individual Customer, c}
+$\alpha_1$×the household income of customer c
+$\alpha_2$× the family size of customer c
+$\alpha_3$×customer c's household size
+$\alpha_4$× customer c's local dealer density
+$\alpha_5$× if customer bought this type, or this make before {Features Describing the Interaction of Customer c and Dealer i}
+$\alpha_6 \times$ distance from customer c to dealer i
+$\alpha_7 \times$ if customer c bought from dealer i before
+$\alpha_8 \times$ dealer i's rescaled number of sales in customer c's ZIP code
+$\alpha_9 \times$ if dealer i is within 10 miles of customer c
+$\alpha_{10} \times$ if dealer i is within 10-30 miles of customer c
+$\alpha_{11} \times$ if dealer i is within 30-60 miles of customer c
+$\alpha_{12} \times$ if dealer i is within 60-100 miles of customer c
+$\alpha_{13} \times$ if dealer i is within 100-250 miles of customer c
+$\alpha_{14} \times$ if dealer i is in the same state as customer c
+$\alpha_{15} \times$ difference between the dealer's drive time and maximum drive time within each cohort
+$\alpha_{16} \times$ dealer's rescaled drive time within each cohort
+$\alpha_{17} \times$ dealer's rescaled price and rescaled drive time interaction
+$\varepsilon_{c,t,i}$ Although the dealer rank may not change if customer features and customer historical preference variables are excluded from the DSA, they are included in the example DSA model described above because the overall probability of closing may be different for different makes. The probability of closing can be further applied to calculate each dealer's expected revenue and that number can be affected by the choice of make and customer local dealer density.

Once the top three dealers are chosen, they are presented to the customer in the order determined by the expected revenue value.

Referring again to FIG. 3, once the ranks have been assigned, the presentation decision can be made and any affiliate for which the rank is less the maximum number set by the intermediary may be displayed. If $ER_{i,t,z}$ is the expected value rank of outlet i for item t in geographic unit z, then the display decisions are:

Display outlet i if $r \leq \kappa$
Do not display outlet i if $r > \kappa$
Among the $\kappa$ outlets chosen for display, present in order (top to bottom on the screen) according to rank, so the outlet for which r=1 [indexed by $O_1(i)$] is the first outlet displayed, the outlet for which r=2 is displayed below the first one, and so on until all of the outlets with rank r=$\kappa$ have been displayed.

Before explaining how an affiliate may use the ADM tool to identify opportunities for adjusting the probability of sale (and thereby the display decisions), the mechanics of that component of the expected revenue is first described. The per-unit revenue paid to the intermediary, $\pi_{i,t}$, is likely not controllable by the affiliate. However, the display decisions (display/no display, and display order) may be influenced by the probability of sale component, $P_{i,t,z}$, of the expected revenue.

As an example, the probability of outlet i closing a sale on item t to a customer from geographic unit z can be based on a logistic regression equation of the form:

$$P_{i,t,z} = \frac{1}{1+e^{-\theta_{i,t,z}}}$$

where $\theta_{i,t,z} = x_{i,t,z}\gamma + y_{i,t,z}\beta + \varepsilon_{i,t,z} = \gamma_o + \gamma_1 X_{i,t,z,1} + \gamma_2 X_{i,t,z,2} + \ldots + \gamma_m X_{i,t,z,m} + \beta_q Y_{i,t,z,q} + \beta_{q+1} Y_{i,t,z,q+1} + \ldots + \beta_r Y_{i,t,z,r}$ each $X_{i,t,z,k}$ (k=1, ..., m) reflects an exogenous feature of outlet i with respect to product t for which outlet i has no ability to change. For example, outlet i may not have any ability to change the distance between outlet i and the customer. "Distance" in this case represents an exogenous variable.

each $Y_{i,t,z,r}$ (q=1, ..., r) reflects an endogenous feature of outlet i with respect to product t for which outlet i can change. For example, outlet i can change the price on item t or its customer satisfaction rating. "Price" and "customer satisfaction rating" in this case represent endogenous variables.

Independent variables, X and Y, reflecting 1) individual outlet features, 2) individual outlet features relative to other outlets, 3) individual customer features and 4) customer's historical preference should be considered as potential factors based on empirical knowledge on their relationship with closing a sale. Data transformation is performed for variables with large variance or skewed distribution. Missing values can be imputed based on appropriate estimates such as using local average of historical data. Forward, backward and stepwise model selection procedures can be used to select independent variables. Rescaled or additional derived variables can be defined in order to reduce the variance of certain variables and increase the robustness of coefficient estimates. The final model coefficients are chosen such that the resulting estimate probability of sale is most consistent with the actual observed sales actions given the vendors displayed historically.

In order to be displayed given a new search, an outlet is expected revenue for the intermediary, $ER_{i,t,z} = P_{i,t,z} \times \pi_{i,t}$, must be higher than that of outlet j indexed by $O_r(j)$ such that $r = n_{t,z}$. As discussed above, $\pi_{i,t}$ is unlikely to be changed by outlet i. However, outlet i can affect the display decision by modifying, for example, the probability of sale component, $P_{i,t,z}$, of the expected revenue equation:

$$P_{i,t,z} = \frac{1}{1+e^{-\theta_{i,t,z}}}$$

where $\theta_{i,t,z} = x_{i,t,z}\gamma + y_{i,t,z}\beta + \varepsilon_{i,t,z} = \gamma_o + \gamma_1 X_{i,t,z,1} + \gamma_2 X_{i,t,z,2} + \ldots + \gamma_m X_{i,t,z,m} + \beta_q Y_{i,t,z,q} + \beta_{q+1} Y_{i,t,z,q+1} + \ldots + \beta_r Y_{i,t,z,r}$ When the revenue paid to the intermediary is identical for all i=1, ..., I eligible affiliates, the ordered ranking Or(i) of the expected revenues is identical to the ordered rankings of $\theta_{i,t,z}$. Thus, changing the display position and ranking can be enabled by varying the inputs to the equation $\theta_{i,t,z} = x_{i,t,z}\gamma + y_{i,t,z}\beta$. As the vector of variables x are exogenous, they may not be varied by the affiliate. By a process of elimination, changes in display position can be made by changing the values of the endogenous independent variables contained in the vector y.

As shown in FIG. 3, in addition to the computed expected revenue for the intermediary, DPA 398 may also output the affiliate's display position, number of leads, sales, and revenues for the affiliate, etc. (step 304). If output levels indicate certain target(s) is/are not met (step 306), the affiliate can, utilizing an affiliate decision-making tool such as one embodiment of ADM tool 290 described above, determine the level(s) of endogenous variable(s) required to meet the desired target(s) (step 308).

Suppose that one of the endogenous independent variables, $v_{i,t,z}$, can be isolated such that $y_{i,t,z} = +y'_{i,t,z} + v_{i,t,z}$. The value of that variable may be changed by outlet i in order to generate a new ranking (step 310). If the revenue paid to the ecommerce intermediary company differs by affiliate, the full value of the expected revenue is recalculated by DPA 398 as the values in the linear equation, $\theta_{i,t,z}$, are varied. Again, $\theta_{i,t,z}$ is a computational component of the probability of sale component, $P_{i,t,z}$, which, in turn, is a component of the expected revenue, $ER_{i,t,z}$, for the intermediary.

Figure 5:
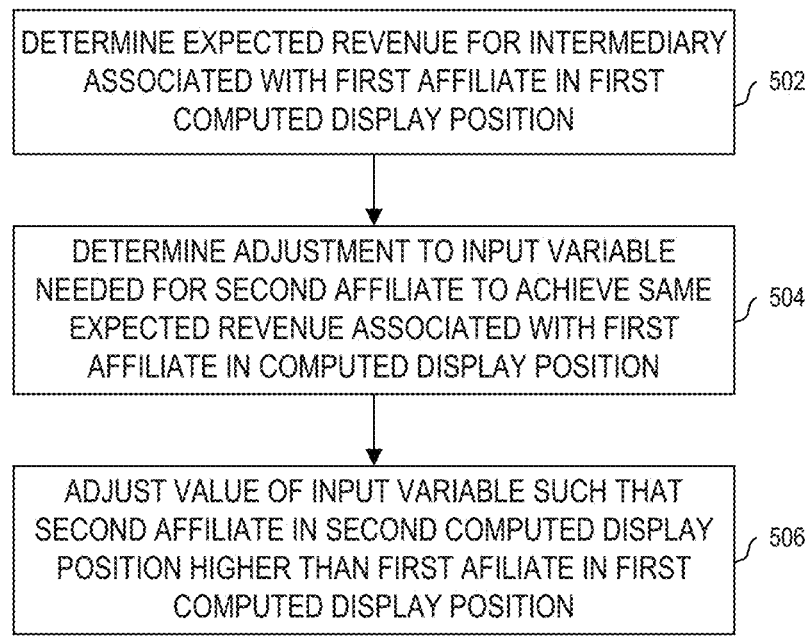
FIG. 5 depicts a flow diagram illustrating one embodiment of a method for ensuring an introduction utilizing an affiliate decision-making tool.

One embodiment of a method for ensuring an introduction utilizing an affiliate decision-making tool will now be described with reference to FIG. 5.

As described above, embodiments of an ADM tool disclosed herein can allow a user to interact with a position display algorithm (PDA) to vary the value of a selected variable, $v_{i,t,z}$, to ensure that their outlet is chosen for display. As an example, in one embodiment, method 500 may include determining an expected revenue for an intermediary that is associated with outlet j in an ordered position $r=\kappa$: $ER[O_k(j)]$ determined by the PDA (step 502).

Method 500 may also include determining an adjustment to an input variable for the PDA that outlet i must make such that the expected revenue for the intermediary that is associated with outlet i is the same as outlet j (step 504). In one embodiment, this step may include:

computing the target probability of sale, $P_{i,t,z}^{(k)}$, that must result in order for outlet i to achieve the same expected revenue (and rank) as outlet j who is displayed in the position $\kappa$, where $\kappa$: $P_{i,t,z}^{(k)} = ER[O_k(j)]/\pi_{i,t}$;

populating the computational component, $\theta_{i,t,z}^{(k)}$ of the target probability of sale such that $\theta_{i,t,z}^{(k)} = x_{i,t,z}\gamma + y_{i,t,z}'\beta - \beta_v(v_{i,t,z}+\delta)$; and solving an adjustment, $\delta$, for a variable, $v_{i,t,z}$, where $\delta = \theta_{i,t,z}^{(k)} - x_{i,t,z}\gamma - y_{i,t,z}'\beta - {}_v v_{i,t,z}$.

The value of the input variable, $v_{i,t,z}$, can then be adjusted such that the display position for outlet i is ranked higher than display position $\kappa$ for outlet j (step 506). In one embodiment, this can be done by first adjusting the value of the input variable, $v_{i,t,z}$, by an amount equal to $(\alpha \times \delta)$ where $\alpha = -1$ if $\beta_v \leq 0$ and $\alpha = +1$ if $\beta_v > 0$. This ensures that the final ER value (for the intermediary) associated with outlet i is the same as the ER associated with outlet j (and so the decision by the intermediary to display is the same for both outlets). The adjustment, $\delta$, can then be modified by a tiny amount, $\varepsilon$, until $O_{\kappa-1}(h) < O_\kappa(i, \delta+\varepsilon) < O_\kappa(j)$, where $O_{\kappa-1}(h)$ corresponds to outlet h with rank $\kappa-1$ prior to the changes induced by $\delta$. This ensures outlet i a chance to be displayed and introduced by the intermediary.

Figure 6:
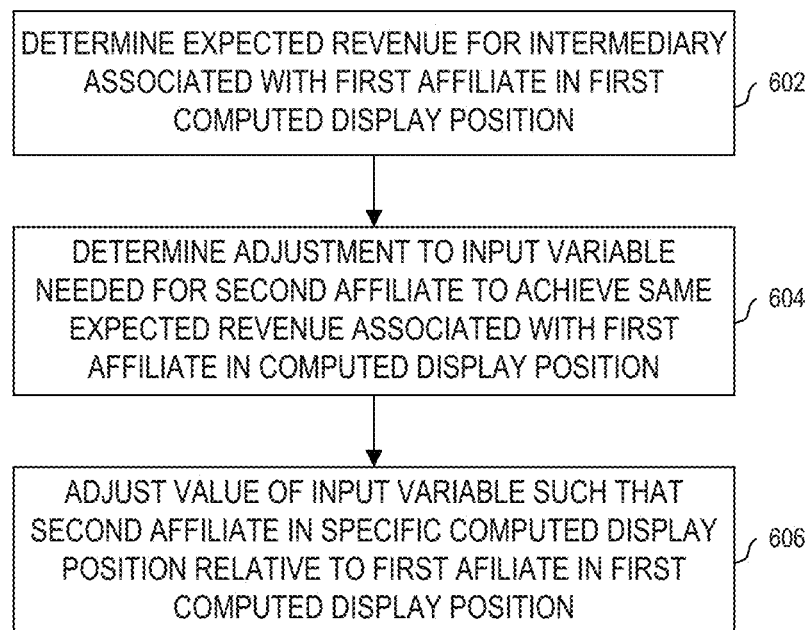
FIG. 6 depicts a flow diagram illustrating one embodiment of a method for varying display position to a specific rank utilizing an affiliate decision-making tool.

One embodiment of a method for varying display position to any rank, s, will now be described with reference to FIG. 6.

As discussed above, an affiliate may make decisions to ensure that their outlet is displayed and receive an introduction when a consumer searches for an item that the outlet has for sale. Method 500 illustrates an example by which an affiliate can not only ensure that their outlet be displayed, but may also achieve a specific position in the ordered display.

As an example, in one embodiment, method 600 may include determining an expected revenue for an intermediary that is associated with outlet j in an ordered position $r=s$: $ER[O_s(j)]$ determined by the PDA (step 602).

Method 600 may also include determining an adjustment to an input variable for the PDA that outlet i must make such that the expected revenue for the intermediary that is associated with outlet i is the same as outlet j (step 604). In one embodiment, this step may include:

computing the target probability of sale, $P_{i,t,z}^{(s)}$, that must result in order for outlet i to achieve the same expected revenue (and rank) as outlet j who is displayed in the position s, where s: $P_{i,t,z}^{(s)} = ER[O_s(j)]/\pi_{i,t}$;

populating the computational component, $\theta_{i,t,z}^{(s)}$, of the target probability of sale such that $\theta_{i,t,z}^{(s)} = x_{i,t,z}\gamma + y_{i,t,z}'\beta - \beta_v(v_{i,t,z}+\delta)$; and solving an adjustment, $\delta$, for a variable, $v_{i,t,z}$, where $\delta = \theta_{i,t,z}^{(s)} - x_{i,t,z}\gamma - y_{i,t,z}'\beta - \beta_v v_{i,t,z}$.

The value of the input variable, $v_{i,t,z}$, can then be adjusted such that outlet i is ranked at a specific display position (step 606). In one embodiment, this can be done by first adjusting the value of the input variable, $v_{i,t,z}$, by an amount equal to $(\alpha \times \delta)$ where $\alpha = -1$ if $\beta_v \leq 0$ and $\alpha = +1$ if $\beta_v > 0$. This ensures that the final ER value (for the intermediary) associated with outlet i is the same as the ER associated with outlet j (and so the decision by the intermediary to display is the same for both outlets). The adjustment, $\delta$, can then be modified by a tiny amount, $\varepsilon$. If the rank before attempting to reposition outlet i is denoted $O_b(i)$ and:

If b<s then choose an adjustment value target so that $O_{s-1}(h) < O_s(i, \delta+\varepsilon) < O_s(j)$, where $O_{s-1}(h)$ corresponds to outlet h with rank s−1 prior to the changes induced by $\delta$.

If b>s then choose an adjustment value target so that $O_s(j) > O_s(i, \delta+\varepsilon) > O_{s+1}(h)$ where $O_{s+1}(h)$ corresponds to outlet h with rank s+1 prior to the changes induced by $\delta$.

By analyzing historical data, one can determine the percentage of introductions that convert in a lead $\lambda_{i,t,z}$. If $n_{i,t,z}(r)$ represents the number of historical introductions by in geographic unit z for item t and outlet i and $\lambda_{i,t,z}(r)$ represents the number of leads that were resulted from those introductions, then the conversion rate for each display positions can be: $c_{i,t,z}(r) = \lambda_{i,t,z}(r) \div n_{i,t,z}(r)$. Based on expected future demand, $d_{t,z}$, for item t in area z, the total number of expected leads is:

$$L_{i,t,z} = \sum_{r=1}^{k} n_{i,t,z}(r: r \leq k) \times c_{i,t,z}(r)$$

where $n_{i,t,z}(r: r \leq k)$ are the introductions in position r that occurred because the expected revenue value was high enough to cause the affiliate to be displayed.

If an affiliate is working under a pay-per-lead agreement with the intermediary, they may employ the ADM tool discussed above to determine how many leads they would be responsible for paying, along with the monetary value associated with the service provided by the intermediary. Should the affiliate desire to go one step further and see how their display position ranking decisions will impact sales volume and revenue for the affiliate, the ADM tool can also make that possible. First, a few more definitions:

$\rho_{i,t}$: represents the per-unit revenue realized by an affiliate when the sale of item t is made.

$\chi_{i,t}$: represents the per-unit cost to the affiliate for item t.

$L_{i,t,z}$: represents the number of leads for goods/services of item t offered by outlet i to geographic unit z.

$\omega_{i,t}$: represents the amount of inventory of item t for which outlet i can sell.

The geographic unit z may be a ZIP code, city, county, state, or any other spatial entity for which the online search was restricted.

Computation of the expected number of sales is: $Sales_{i,z} = \sum_{t=1}^{T} \min(\omega_{i,t}, \sum_{z=1}^{Z} P_{i,t,z} L_{i,t,z})$ and the total amount of gross margin is: $GM_i = [\sum_{t=1}^{T}(\rho_{i,t} - c_{i,t}) \cdot \min(\omega_{i,t}, \sum_{z=1}^{Z} P_{i,t,z} L_{i,t,z})]$. Note in this case, the total sales of item t is constrained by the available inventory at outlet i.

The ability to easily visualize the effects of varying inputs on various metrics such as display rank, leads, sales, and gross margin can provide many advantages. For example, embodiments of an affiliate decision-making tool can allow a customer or affiliate of an intermediary to:

Know how many introductions are anticipated in a specified time period (e.g., the next fiscal quarter) in a specific geographic area for all of the affiliates (themselves and their competitors) offering the product being request.

Understand, assuming existing levels of business inputs (inventory, prices, etc.), the number and percentage of introductions they will receive in that time period and the display positions of each of their introductions.

Develop an estimate of how many leads and sales are expected to result from their present operations in the local competitive market along with the gross margins associated with that activity.

Develop an ability to select any endogenous business input over which he has control and determine how varying their values will impact introductions, display positions, leads, sales, and gross margin.

A user may explore varying levels of each endogenous variable one-by-one while holding fixed all other inputs, including competitors ER values, exogenous variables, and the endogenous variables not being presently analyzed.

A user may find an optimal value of one endogenous input, update its value, and explore a different endogenous variable.

Figure 7C:
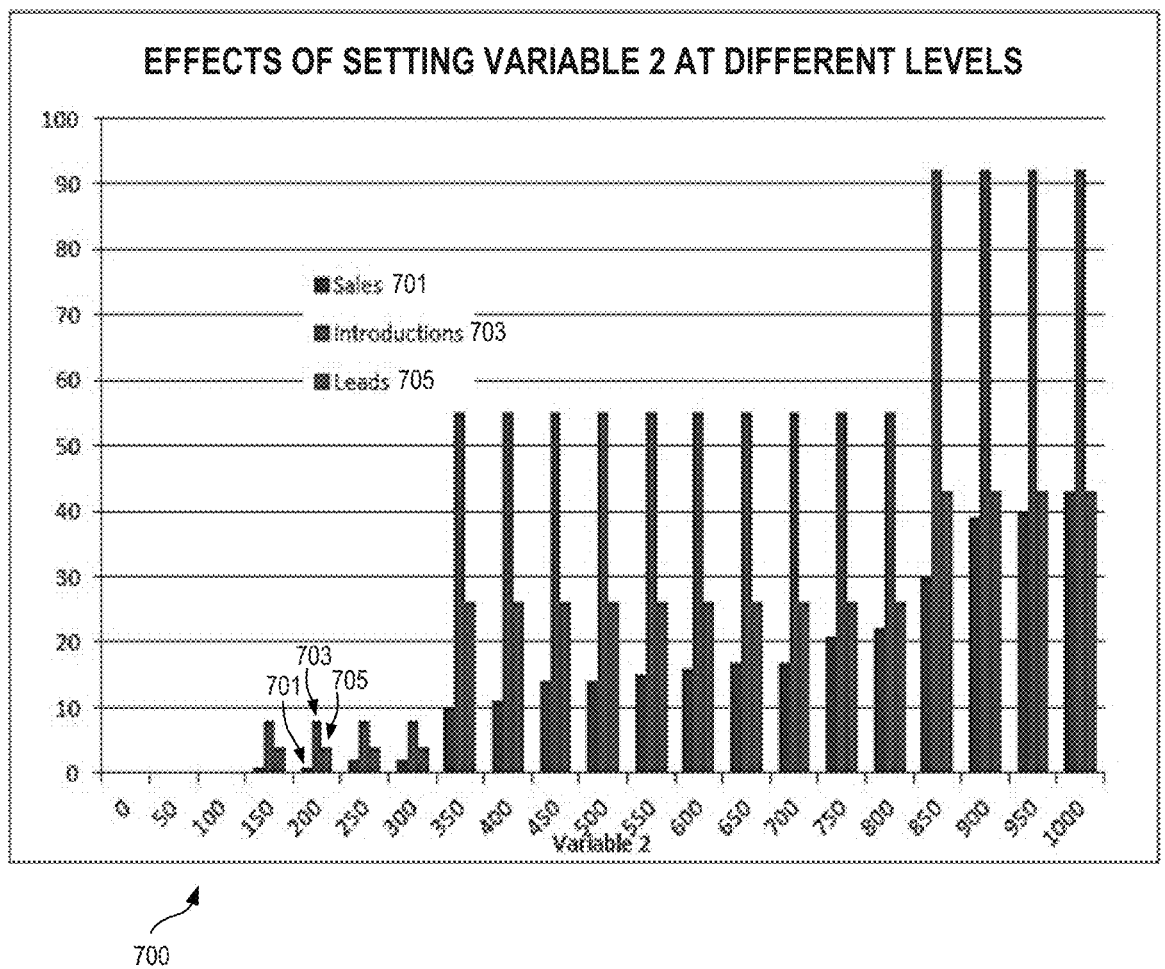
FIG. 7C depicts a plot diagram illustrating effects of setting an example variable utilized in one embodiment of a methodology disclosed herein.

FIGS. 7A-7C illustrate how effects of varying inputs on various metrics may be visualized. Suppose an affiliate is associated with an outlet identification (outlet ID) '123' and is researching a particular item 'XYZ' in a local area 'California.' Additionally, suppose an ecommerce intermediary will only show the top κ=3 affiliates and demand analysis indicates that there should be 300 total introductions made in the period of analysis. FIG. 7A shows that a user has chosen an endogenous variable 'Variable 2' having a value '200' for further analysis. FIG. 7B shows all the possible values of Variable 2 and the number of introductions, leads, sales, and revenue associated therewith. In this example, Variable 2 having a value 200 is also associated with the third display position that the ecommerce intermediary will show to a website visitor inquiring about item XYZ in California. Embodiments of an ADM tool can have knowledge of all existing values for all input variables and be cognizant of the inputs for all of affiliate 123's competitors offering item XYZ in California. FIG. 7B also shows that affiliate 123 has set the level of Variable 2 at 200 and has chosen that endogenous variable for exploration. FIG. 7C depicts a plot diagram illustrating effects of setting Variable 2 at various levels on the number of sales (701), the number of introductions (703), and/or the number of leads (705). As FIGS. 7A-7C exemplify, these visualizations can help a user understand how changing the level of Variable 2 to different values (between 0 and 1000) may impact display position, leads, sales and gross margin for affiliate 123.

An example embodiment in the context of the retail automotive industry will now be described in detail. Specifically, if an ecommerce intermediary (such as one embodiment of intermediary 220 described above) has an agreement to make introductions between individuals searching for a vehicle on their site (such as one embodiment of network site 270 described above) and dealerships (such as one embodiment of outlets 230a . . . outlets 230n described above) offering the vehicle being considered, the decision-making tool (such as one embodiment of affiliate decision-making tool 290 described above) would be appropriate. Dealers could use the decision-making tool to understand how changing its endogenous variables (e.g., vehicle prices, its inventory, customer satisfactions scores, customer perks, etc.) would affect the number of introductions, leads, sales and gross margin. In this example, a system (such as one embodiment of vehicle data system 200 described above) that is owned and operated by the intermediary may implement a display position algorithm (such as DPA 298 described above). The intermediary may operate in a known competitive dealer environment in which the system would have knowledge with respect to the number of dealers (affiliates), dealer locations, vehicle pricing, etc. In response to an online search by a visitor to the network site (such as visitor 210 to network site 270 described above), the system may determine which dealers should be introduced to the user and in what order should the eligible dealers be presented. In some embodiments, the intermediary can be paid a flat fee for every introduction that yields a sale. Since an objective of the intermediary and its affiliates are to maximize sales, all parties involved can realize a benefit (increased revenue) when a sale is made. In some embodiments, the Expected Revenue value (ER) used during execution of the example display position algorithm disclosed herein can be based on the amount of revenue expected to be paid to the intermediary.

One example of how a dealer affiliated with the intermediary can benefit from an embodiment of an affiliate decision-making (ADM) tool disclosed herein is that the ADM tool can allow the dealer to investigate how the endogenous price variable may be used to influence display position and the number of leads. The ADM tool can assist dealers in optimizing their price setting and inventory selection. As the display position algorithm (DPA) can be a function of the dealer's price, the dealer could solve for various levels of price in closed-form to identify the levels of price at which the dealer's expected revenue will place it in the top display positions κ (where κ=3 in one embodiment) from among the possible selection group.

As a specific example, the system may operate to perform the following:

1): Using demand from the last 30 days, re-estimate ER for each vehicle trim the system received at the price submitted. Referring to FIG. 8, which depicts an example of a view where the dealer-level ER for various Make/Model/Trims in various customer ZIP codes are displayed. The 'offset price' is an expressed value relative to the dealer invoice amount. As an example, an offset or −250 means the offered price is $250 below invoice. 'Rank at time' may indicate the display rank computed by the DPA and 'currently displayed' may indicate if an introduction was made (when the maximum number of display positions is 3 and the determined display rank is less than or equal to 3).

2): The system may compute what level of pricing would be necessary for this dealer to display. This computation can be performed using the procedure described above. By selecting a price that would increase the ER by an amount such that it is equal to the ER of the competitor currently in the third display position, the dealer can slightly lower its price so that its ER is sufficient to be the third ranked dealer. This is illustrated in FIG. 8 where the system computes and presents to a user (for an affiliated dealership) the price of the vehicle that must be offered in order for the dealership to be displayed (being in the third position) or not displayed (being in the fourth position).

Figure 10:
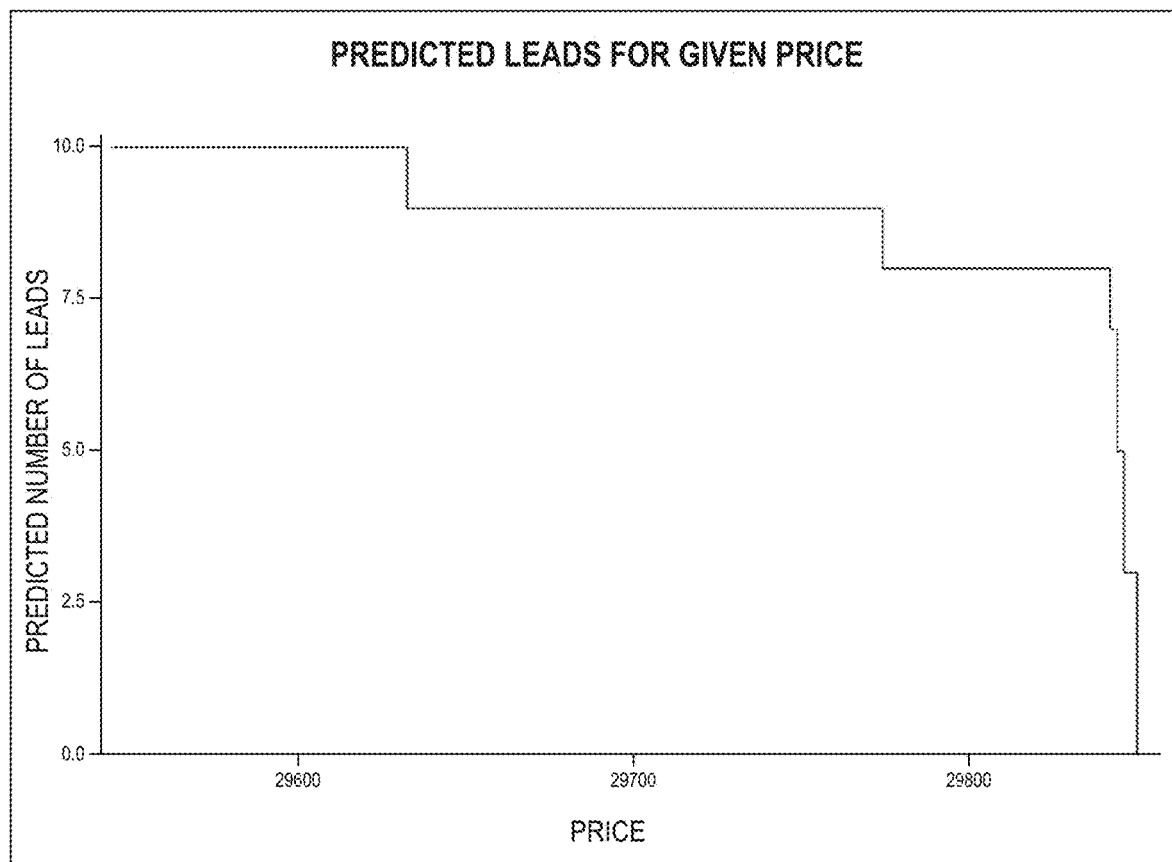
FIG. 10 depicts a plot diagram illustrating an example relationship between predicted leads and item price according to one embodiment disclosed herein.

3): The system may aggregate this information into a dealer-trim level to provide the estimated number of leads for each dealership, as illustrated in FIG. 9. In this case, it can be seen that the greater the offset the higher the number of leads at both the trim level and the model level for this particular dealer. As illustrated in FIG. 10, this information can be graphically displayed to show the dealer how their vehicle pricing may affect the number of leads that they may receive from the intermediary.

4): The system may estimate relative demand levels for a period of time. As an example, this can be the next 30 days. This forecast can be performed based on expert opinion or any typical forecasting methodology. For instance, the forecast might determine that demand over the next 30 days is likely to be 10% higher than that over the past 30 days. This factor can be used to scale up the historically known demand described above. Note that a small number of examples is illustrated herein. Thus, when apply a scaling factor like 1.1, there might be many fractional values. In practice, with a very large sample, these factors may be large enough to make a difference while still rounding off to the nearest whole number.

FIG. 11 depicts an example interface of a vehicle data system implementing one embodiment of a methodology disclosed herein. Specifically, in this example, interface 1100 may represent a portion of an automotive website owned and operated by TrueCar, Inc. ("TrueCar website"). As demand for vehicles is realized through searches on the TrueCar website, embodiments implementing a display position algorithm described above can determine which dealers are displayed and the order in which they are displayed. In this way, the TrueCar website can introduce their affiliates to website visitors. The number of affiliates displayed by the TrueCar website to a website visitor is referred to as the number of introductions. In the example of FIG. 11, three introductions—introductions 1101, 1103, and 1105 for three affiliated dealers in the search zip code '90401'—are made and shown to a website visitor via interface 1100. At this point, although a quantity of introductions has occurred, no lead has been generated. Should the website visitor choose to proceed, they can select any number of the affiliates thus introduced. In this example, two affiliates associated with introductions 1101 and 1105 are selected. In FIG. 11, introductions 1101, 1103, and 1105 do not show the names of the affiliates. In some embodiments, the name of an affiliate may be included in an introduction.

To determine varying levels of estimated introductions, embodiments can vary the price to identify a functional relationship between price and the quantity of introductions. For example, the display position algorithm can construct an 'expected revenue' value reflecting the probability of sales and the revenue that would benefit TrueCar if the sale is realized.

In some embodiments, the expected revenue can be computed with respect to TrueCar to reflect a pay-per-sale model (PPS) where TrueCar is paid only when an introduction they make on a dealer's behalf is eligible to be displayed to a consumer (for instance, via interface 1100) in order of expected revenue (highest expected revenue on top, followed by the second highest expected revenue). As an example, in some embodiments, to be eligible for display, the dealer must be an approved member of the TrueCar network, be within close geographic proximity of the customer (no more than 3 hours driving time in one embodiment), and sell the automotive brand that corresponds to the customer's query.

In the example of FIG. 11, the number of dealers displayed is limited to 3 (if that many dealers are eligible). In this case, to be eligible for display, the dealer would have one of the three highest expected revenue values among eligible dealers. As selection of display and the corresponding position are desirable (the first display position has historically been highly correlated with sales volume/gross margin), network dealers are interested in taking action that will change their display position. The innovation presented in this disclosure can help dealers determine how changes in pricing, performance, inventory management, and other factors can be used to affect desired positions displayed via an intermediary, such as the TrueCar website owned and operated by TrueCar, and thereby achieve gross margin targets.

Figure 12:
FIG. 12 depicts an example interface showing a portion of a vehicle data system implementing one embodiment of a methodology disclosed herein.

FIG. 12 depicts example leads generated from the introductions shown in FIG. 11, according to one embodiment disclosed herein. As shown in FIG. 11, only two of the three introductions were of interest to the website visitor (as selected by the website visitor via interface 1100). Consequently, only two leads were generated from the three introductions made by the intermediary. In this example, the website visitor is presented with, via interface 1200, location and contact information for each of the selected dealers 1201 and 1205, along with the specific vehicle configuration and vehicle pricing information. The competitive, upfront price quotes from dealers 1201 and 1205 may be presented in form of certificates which the website visitor can take to dealers 1201 and/or 1205 and perhaps make an on-site purchase of the specific vehicle configuration, thereby closing a sale.

In embodiments described above, a user can maneuver an affiliate decision-making tool and explore the impact on displays, leads, sales, and gross margin that may result from setting endogenous variables at various levels. Some embodiments of an affiliate decision-making tool may be configured to operate in an automated manner. More specifically, a user can set a single desired level of output (displays or leads or sales or gross margin), and the affiliate decision-making tool would automatically determine a set of values for the full set of endogenous values that would result in the target level of output. The user may also hold the level of any endogenous variable fixed and the affiliate decision-making tool could then determine a set of levels for which the remaining endogenous variables would yield the desired solution, if such a solution exists. In such automated embodiments, a user could set the desired output levels and no longer need to interact with the affiliate decision-making tool. Accordingly, the user would be allowed to "set it and forget it".

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments of the present invention can be implemented in a computer communicatively coupled to a network (for example, the Internet, an intranet, an internet, a wide area network (WAN), a local area network (LAN), a storage area network (SAN), etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for varying a display position of a dealer on a website, the method comprising:
   receiving, by a server computer, exogenous variables associated with an item, each of the exogenous variables representing an exogenous feature of a dealer with respect to the item, the exogenous feature not under control by the dealer;
   providing, by a server computer through a user interface on a user device under control of the dealer, a view comprising endogenous variables and the exogenous variables associated with the item, each of the endogenous variables representing an endogenous feature of the dealer with respect to the item, each of the endogenous features changeable by the dealer, the server computer associated with the website and operating independently of the dealer, wherein the user interface on the user device includes a visualization function for user-selection of any of the endogenous variables in the view and for visualizing effects of varying a value of a user-selected endogenous variable;
   receiving, by the server computer through the user interface on the user device, an indication that an endogenous variable has been selected by a user from the endogenous variables in the view for further analysis, the user-selected endogenous variable having a value set by the dealer, the value associated with a display position for the dealer that the website is to display to a website visitor inquiring about the item through the website;
   in response to the indication, computing, by the server computer, effects of how setting the user-selected endogenous variable at different levels affects a plurality of metrics that the server computer provides to the dealer through the website;
   generating, by the server computer, a visualization of the effects of setting the user-selected endogenous variable at the different levels, wherein the visualization of the effects comprises the plurality of metrics, and wherein the plurality of metrics relate to factors that affect potential future sales of items by the dealer; and
   providing, through the user interface on the user device, the visualization of the effects of setting the user-selected endogenous variable at the different levels.

2. The method according to claim 1, wherein the plurality of metrics includes the display positions, the number of introductions, the number of leads, and the number of expected sales of the item.

3. The method according to claim 1, further comprising:
   in response to the website visitor inquiring about the item in a geographic unit through the website, determining eligible dealers in the geographic unit and, for each respective dealer of the eligible dealers in the geographic unit, determining an expected revenue that the respective dealer is to pay an intermediary;

sorting the eligible dealers in the geographic unit based on the expected revenue determined for the respective dealer;

in accordance with the sorting, assigning a rank to the respective dealer of the eligible dealers in the geographic unit;

selecting a set of dealers from the eligible dealers in the geographic unit based on the rank assigned to the respective dealer;

determining display positions of the set of dealers on the website based on the rank assigned to the respective dealer; and presenting the set of dealers in the geographic unit to the website visitor through the website according to the display positions thus determined.

4. The method according to claim 1, wherein the endogenous feature of the dealer with respect to the item comprises a dealer price for the item, a customer satisfaction rating, a dealer inventory, a customer perk, or a dealer-provided incentive.

5. The method according to claim 1, wherein the exogenous feature of the dealer with respect to the item comprises a distance between the dealer and the website visitor, macroeconomic data, weather, or time.

6. The method according to claim 1, wherein the visualization of the effects comprises a data structure, table, or graph.

7. The method according to claim 1, wherein the item comprises a vehicle having a vehicle configuration and residing in a geographic unit.

8. The method according to claim 1, further comprising:
determining an adjustment to the value of the user-selected endogenous variable such that the display position for the dealer is within a maximum number of display positions that the website is to display to a website visitor inquiring about the item through the website.

9. The method according to claim 1, further comprising:
determining an adjustment to the value of the user-selected endogenous variable such that the display position for the dealer is at a specific position that the website is to display to a website visitor inquiring about the item through the website.

10. The method according to claim 1, further comprising:
providing, by the server computer through the user interface on the user device, a dealer decision-making tool having a visualization function for generating the visualization.

11. A system for varying a display position of a dealer on a website, the system comprising:
a processor;
a non-transitory computer-readable medium; and
stored instructions translatable by the processor for:
receiving exogenous variables associated with an item, each of the exogenous variables representing an exogenous feature of a dealer with respect to the item, the exogenous feature not under control by the dealer;
providing, through a user interface on a user device, a view comprising endogenous variables and the exogenous variables associated with the item, each of the endogenous variables representing an endogenous feature of the dealer with respect to the item, each of the endogenous features changeable by the dealer, the server computer associated with the website and operating independently of the dealer, wherein the user interface on the user device includes a visualization function for user-selection of any of the endogenous variables in the view and for visualizing effects of varying a value of a user-selected endogenous variable;
receiving, through the user interface on the user device, an indication that an endogenous variable has been selected by a user from the endogenous variables in the view for further analysis, the user-selected endogenous variable having a value set by the dealer, the value associated with a display position for the dealer that the website is to display to a website visitor inquiring about the item through the website;
in response to the indication, computing effects of how setting the user-selected endogenous variable at different levels affects a plurality of metrics that the server computer provides to the dealer through the website;
generating a visualization of the effects of setting the user-selected endogenous variable at the different levels, wherein the visualization of the effects comprises the plurality of metrics, and wherein the plurality of metrics relate to factors that affect potential future sales of items by the dealer; and
providing, through the user interface on the user device, the visualization of the effects of setting the user-selected endogenous variable at the different levels.

12. The system of claim 11, wherein the plurality of metrics includes the display positions, the number of introductions, the number of leads, and the number of expected sales of the item.

13. The system of claim 11, wherein the stored instructions are further translatable by the processor for:
in response to the website visitor inquiring about the item in a geographic unit through the website, determining eligible dealers in the geographic unit and, for each respective dealer of the eligible dealers in the geographic unit, determining an expected revenue that the respective dealer is to pay an intermediary;
sorting the eligible dealers in the geographic unit based on the expected revenue determined for the respective dealer;
in accordance with the sorting, assigning a rank to the respective dealer of the eligible dealers in the geographic unit;
selecting a set of dealers from the eligible dealers in the geographic unit based on the rank assigned to the respective dealer;
determining, display positions of the set of dealers on the website based on the rank assigned to the respective dealer; and
presenting the set of dealers in the geographic unit to the website visitor through the website according to the display positions thus determined.

14. The system of claim 11, wherein the endogenous feature of the dealer with respect to the item comprises a dealer price for the item, a customer satisfaction rating, a dealer inventory, a customer perk, or a dealer-provided incentive.

15. The system of claim 11, wherein the exogenous feature of the dealer with respect to the item comprises a distance between the dealer and the website visitor, macroeconomic data, weather, or time.

16. The system of claim 11, wherein the visualization of the effects comprises a data structure, table, or graph.

17. The system of claim 11, wherein the item comprises a vehicle having a vehicle configuration and residing in a geographic unit.

18. The system of claim 11, wherein the stored instructions are further translatable by the processor for:
- determining an adjustment to the value of the user-selected endogenous variable such that the display position for the dealer is within a maximum number of display positions that the website is to display to a website visitor inquiring about the item through the website.

19. The system of claim 11, wherein the stored instructions are further translatable by the processor for:
- determining an adjustment to the value of the user-selected endogenous variable such that the display position for the dealer is at a specific position that the website is to display to a website visitor inquiring about the item through the website.

20. The system of claim 11, wherein the stored instructions are further translatable by the processor for:
- providing, through the user interface on the user device, a dealer decision-making tool having a visualization function for generating the visualization.

* * * * *